United States Patent [19]
Ito

[11] Patent Number: 5,268,860
[45] Date of Patent: Dec. 7, 1993

[54] IMAGE ENHANCEMENT SYSTEM

[75] Inventor: Shigehiro Ito, Ibaraki, Japan

[73] Assignee: Victor Company of Japan, Ltd., Yokohama, Japan

[21] Appl. No.: 826,938

[22] Filed: Jan. 29, 1992

Related U.S. Application Data

[63] Continuation-in-part of Ser. No. 760,444, Sep. 17, 1991.

[30] Foreign Application Priority Data

| Sep. 17, 1990 | [JP] | Japan | 2-246717 |
| Jan. 29, 1991 | [JP] | Japan | 3-27877 |
| Feb. 14, 1991 | [JP] | Japan | 3-42592 |
| Feb. 21, 1991 | [JP] | Japan | 3-49086 |
| Feb. 22, 1991 | [JP] | Japan | 3-50528 |

[51] Int. Cl.$^5$ ............................................. G06G 7/02
[52] U.S. Cl. ....................................................... 364/825
[58] Field of Search ..................... 358/166, 162, 37; 364/825, 724.01, 728.05

[56] References Cited

U.S. PATENT DOCUMENTS

| 4,030,121 | 6/1977 | Faroudja | 358/37 |
| 4,160,265 | 7/1979 | Tanaka | 358/37 |
| 4,941,190 | 7/1990 | Joyce | 358/166 X |
| 4,972,359 | 11/1990 | Silver et al. | 364/728.05 |
| 5,063,448 | 11/1991 | Jaffray et al. | 358/160 |

FOREIGN PATENT DOCUMENTS 2237769 2/1974 Fed. Rep. of Germany .
3103099 8/1982 Fed. Rep. of Germany .

Primary Examiner—Long T. Nguyen
Attorney, Agent, or Firm—Jacobson, Price, Holman & Stern

[57] ABSTRACT

Signal components of the luminance signal are delayed by a 90° phase by a first filter and pass therethrough, where the closer the frequencies of the signal components to the upper limit frequency of the frequency bandwidth of the luminance signal, the less the signal components attenuated. The signal components also pass through a second filter, where the phase of the signal components do not change, the closer the frequencies of the signal components to the upper limit frequency of the frequency bandwidth, the less the signal components attenuated. The signal components that have a phase difference of 90° with respect to each other and that pass through each of the filters undergo vector composition to generate a signal that has an amplitude which is the root of the sum of the squares of the two amplitudes. A signal that has the same phase as the signal component that passes through the second filter and that has the same amplitude as the amplitude of the signal subjected to the vector composition is then generated. From this signal the signal component that passes through the second filter is subtracted to generate the edge emphasis component. This edge emphasis component is added to the luminance signal to emphasize the edge of an image.

4 Claims, 19 Drawing Sheets

FIG. 3(j) Sa
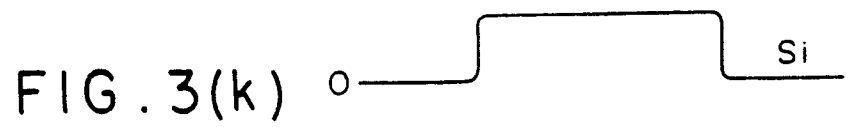
FIG. 3(k) Si
FIG. 3(l) Sa
FIG. 3(m) Si Sa Sb Sc Sd Se Sf Sg — THRESHOLD LEVEL Sh Si Sa Sb Sc Sd Se Sm Si Sa Si Sa Si

IMAGE ENHANCEMENT SYSTEM

This application is a continuation-in-part of application Ser. No. 760,444, filed Sep. 17, 1991, for Image Enhancement System.

BACKGROUND OF THE INVENTION

The present invention relates to an image enhancement system suitable for use in television (TV) receivers, video tape recorders (VTR), printers and other types of video apparatus, various types of image processing apparatus used for performing the recognition, measurement, quantification, diagnosis and other operations for images, as well as various types of data communication apparatus and the like.

Portion of an image which enhances the image is often an edge portion or a portion where the density changes, and the human eye moves towards these portions. Because of this, it is possible to improve the image quality by emphasizing these portions.

Conventionally, when image quality is improved, there is the method for improving the image quality where a secondary differential signal is made from an original signal such as a TV signal and the original and the secondary differential signals are overlapped to emphasize the edge portion.

For example, in the apparatus disclosed in U.S. Pat. No. 4,030,121 (Applied on: Dec. 2, 1975; Inventor: Yves C. Faroudja), an original signal such as a TV signal is differentiated by a first differentiator to form a first differential signal and this signal is differentiated by a secondary differentiator to form a secondary differential signal. The amplitude of this secondary differential signal is limited to a constant level by a limiter.

The first differential signal undergoes full-wave rectification by a full-wave rectifier and this full-wave rectified first differential signal and the amplitude limited secondary differential signal are multiplied together by a multiplier to form the component where the edge is emphasized.

The edge emphasized component is added to the original signal by an adder to form a TV signal where the edge is emphasized.

However, the full-wave rectified first differential signal is included as an unwanted ripple component in the edge-emphasized TV signal to distort the TV signal.

This distortion becomes a cause of deterioration of the image quality. Accordingly, with a conventional image enhancement system, if there is too much edge emphasis, the edge emphasis for improving the image quality conversely acts to deteriorate the image quality and it is extremely difficult to adjust the amount of the edge-emphasized component.

A conventional image enhancement system gives uniform image emphasis on all waveform portions of a TV signal owing to a lack of judging function of the waveform of the TV signal.

A secondary differential signal for edge emphasis, which is formed by a conventional image enhancement system, has a waveform involving peak signal portions situated further outside from mid points of edge portions of a TV signal. This causes preshoots or overshoots when the secondary differential signal is added to the TV signal. This results in a reproduced image the edge of which is hemmed in black and white.

A color runs on a reproduced image when a band width of a color signal varies, the signal being a composite video signal modulated by a color subcarrier varies. In general, a secondary differential signal is added to the color signal after demodulated into a base band signal.

As a reproduced image has been highly qualified, a video apparatus, which produces a video signal having a color signal modulated by a color subcarrier and a luminance signal, both being separated from each other, has spread. An image enhancement system which gives edge emphasis directly on the color signal modulated by the color subcarrier has been awaited.

SUMMARY OF THE INVENTION

The object of the present invention is to provide a signal shaping apparatus that can add an edge-emphasized component only to an input signal without addition of an unnecessary component.

In order to attain the objective described above, the present invention provides a signal shaping apparatus that emphasizes the rise and the fall of an input signal which has signal components in a frequency bandwidth set beforehand.

The apparatus comprises first filter means for delaying by a 90° phase the signal components and outputting the 90° phase-delayed components as a first signal, wherein the closer the signal components to the upper limit frequency of the frequency bandwidth, the less the signal components attenuated, second filter means for outputting the signal components as a second signal, wherein the closer the signal components to the upper limit frequency of the frequency bandwidth, the less the signal components attenuated, signal composition means for performing vector composition of the first and second signals and outputs a third signal having the amplitude which is the root of the square of amplitudes of the first and second signals, signal shaping means for outputting a fourth signal which has the same phase as that of the second signal and the same amplitude as that of the third signal, signal subtraction means for subtracting the second signal from the fourth signal to output rise/fall emphasis components of the input signal, and signal addition means for adding the emphasis components to the input signal to emphasize rise/fall of the input signal.

Other objects and advantages of the present invention will become apparent from the detailed description to follow taken in conjunction with the appended claims.

BRIEF DESCRIPTION OF THE DRAWINGS

FIGS. 3(a) to 3(m) are views showing the waveform of signals that undergo signal processing in each section of the apparatus shown in FIG. 1;

DETAILED DESCRIPTION OF THE PREFERRED EMBODIMENTS

Figure 1:
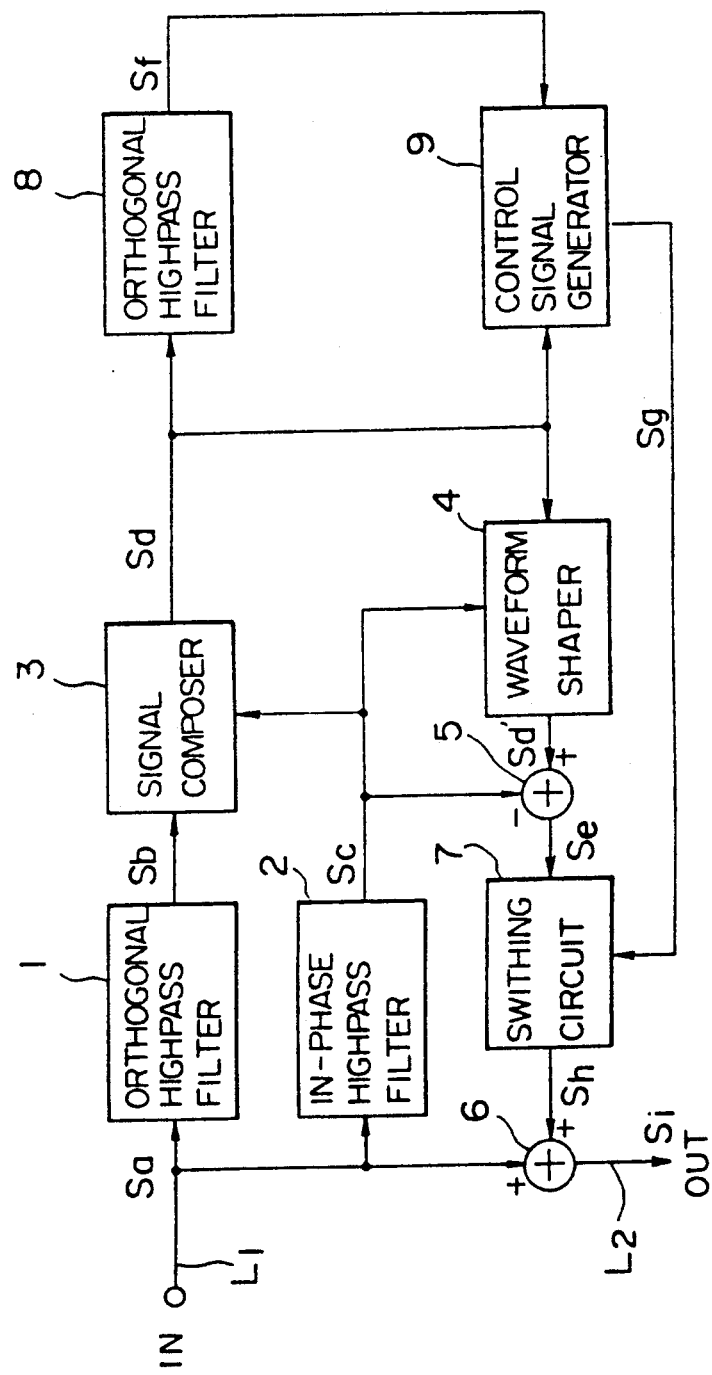
FIG. 1 is a block diagram of a first preferred embodiment of a signal shaping apparatus according to the present invention.

FIG. 1 is a block diagram of a first embodiment of a signal shaping apparatus according to the present invention.

This signal shaping apparatus includes an orthogonal highpass filter 1, an in-phase highpass filter 2, a signal composer 3, a waveform shaper 4, a subtracter 5, an adder 6, a switching circuit 7, an orthogonal highpass filter 8 and a control signal generator 9.

Figure 2:
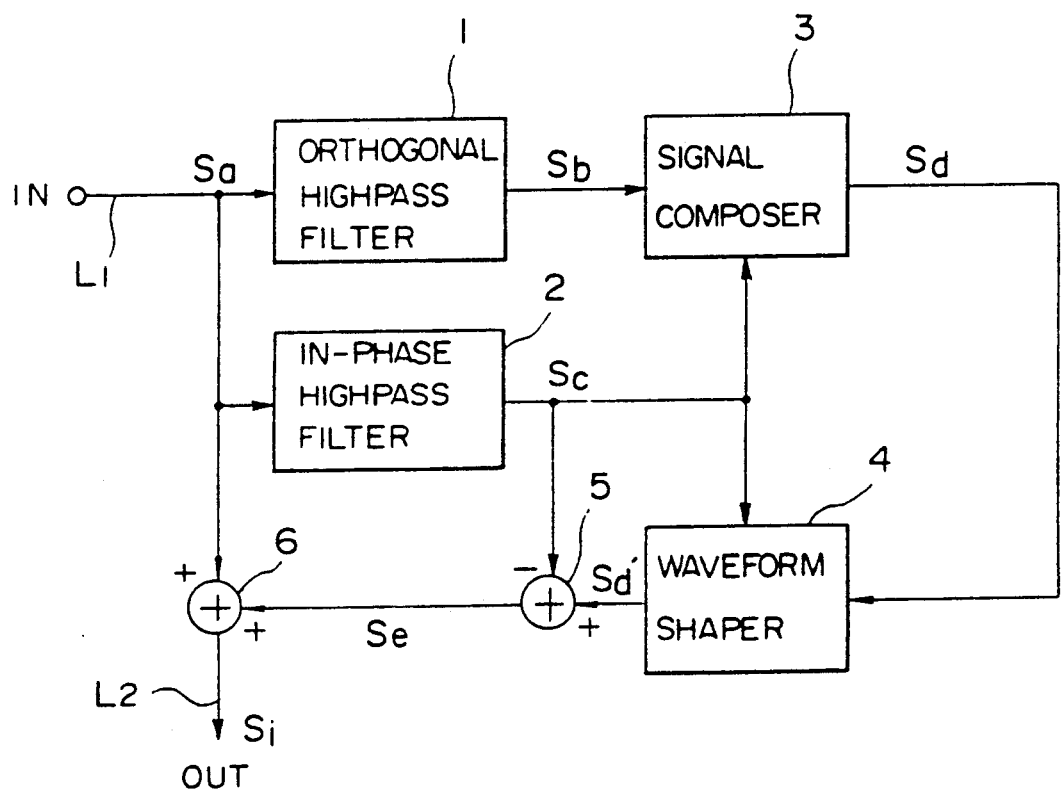
FIG. 2 is a block diagram of main sections for signal shaping in the block diagram shown in FIG. 1.

FIG. 2 is a block diagram of main sections for signal shaping in the apparatus of FIG. 1. Throughout the drawings, like reference numerals and letters are respectively used to designate like or equivalent circuit blocks and signals for the sake of simplicity of explanation. The circuit blocks fallen into the same reference numerals exhibit the same frequency characteristics which will be explained later.

For convenience of description, the description of delay in signals due to the processing time of each of the circuits and delay circuits which perform compensation for this delay is omitted. Signal waveforms to be processed by the signal shaping apparatus are described as analog signal waveforms throughout embodiments for the sake of simplicity of explanation, a digital circuit diagram being introduced later, though.

Figure 3A:
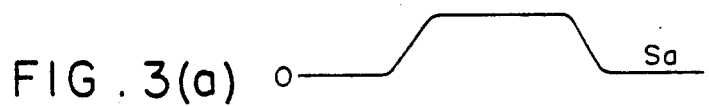
Figure 3B:
Figure 4A:
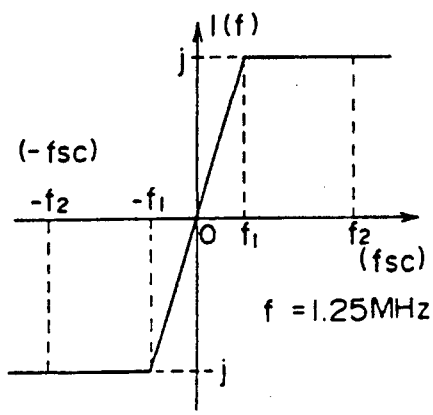
FIGS. 4(a) to 4(f) are views showing the frequency characteristics and impulse response of an orthogonal highpass filter and an in-phase highpass filter shown in FIGS. 1, 2, 10, 13 and 16.

An input signal $S_a$ having a pulse waveform shown in FIG. 3(a) and coming from a line $L_1 1$ is supplied to the orthogonal highpass filter 1 in FIGS. 1 and 2. The characteristics of the orthogonal highpass filter 1 is shown in FIG. 4(a) and the imaginary part portion of the frequency characteristic is expressed by $$I(f) = \begin{cases} jf/f_1 & (|f| \leq f_1, f_1 = 1.25 \text{ MHz}) \\ j & (f_1 < f) \\ -j & (f < f_1) \end{cases} \quad (1)$$

and the real part is zero.

Figure 4B:
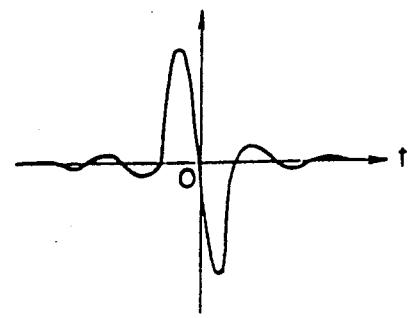

The impulse response of the orthogonal highpass filter 1 is shown in FIG. 4(b). The impulse response has a waveform given to a signal like a TV signal band-limited by an upper limit frequency of 4 MHz. The orthogonal highpass filter 1 is of an origin-symmetrical transversal filter or the like utilizing either an analog or a digital circuit.

FIG. 3 (b) is a view showing the output signal waveform $S_b$ of the orthogonal highpass filter 1.

Figure 4C:
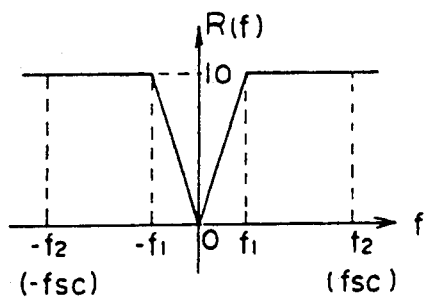
Figure 4D:
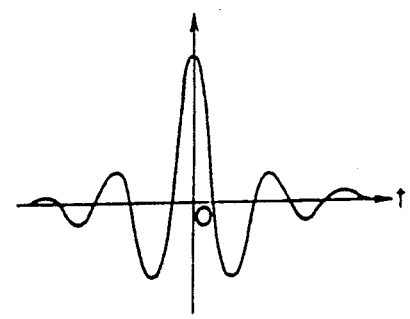

On the other hand, the input signal $S_a$ is also supplied to the in-phase highpass filter 2. The characteristics of the in-phase highpass filter 2 is shown in FIG. 4(c) and the real part of the frequency characteristic becomes $$R(f) = \begin{cases} |f/f_1| & (|f| \leq f_1) \\ 1 & (f_1 < |f|) \end{cases} \quad (2)$$

while the imaginary part is zero. The impulse response of the in-phase highpass filter 2 is shown in FIG. 4(d). The impulse response has a waveform given to a signal band-limited by an upper limit frequency of 4 MHz. The in-phase highpass filter 2 uses a transversal filter or the like that has a symmetrical coefficient value with respect to the time=0 axis, and utilizes either an analog circuit or a digital circuit.

The orthogonal highpass filter 1 and the in-phase highpass filter 2 have the same amplitude characteristic G (f) which is $$G(f) = \begin{cases} |f/f_1| & (|f| \leq f_1) \\ 1 & (f_1 < |f|) \end{cases} \quad (3)$$

and the two characteristics are such that their phases are $\pi/2$ different from each other, and mutually intersecting.

The characteristics shown in FIG. 4(a) has a value in the imaginary number portion, and what has that characteristics is called an orthogonal highpass filter, while the characteristics shown in FIG. 4(c) has a value in the real number portion, and what has that characteristics is called an in-phase highpass filter.

Figure 3C:
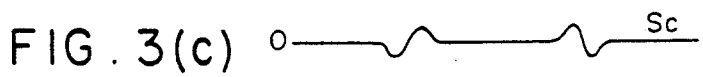
Figure 3D:
Figure 3E:
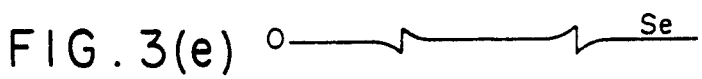
Figure 3F:
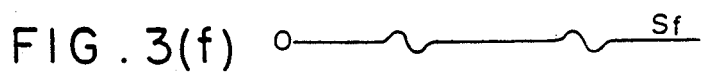

An output signal $S_c$ of the in-phase highpass filter 2 is shown in FIG. 3(c).

Each of the output signals $S_b$ and $S_c$ of the orthogonal highpass filter 1 and the in-phase highpass filter 2 are supplied to the signal composer 3. In the signal composer 3, vector composition between the orthogonal component and the in-phase component in accordance with the following equation (4) is performed to obtain an output signal $S_d$ shown in FIG. 3(d).

$$S_d = \sqrt{S_b^2 + S_c^2} \quad (4)$$

Figure 5A:
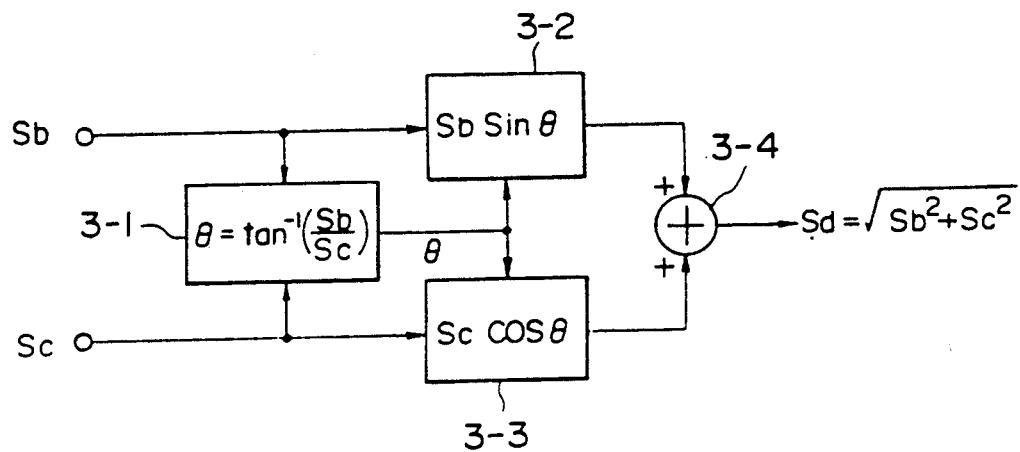
FIGS. 5(a) and 5(b) show two examples of circuit diagrams of a signal composer shown in FIGS. 1, 2, 10, 13 and 16.
Figure 5B:
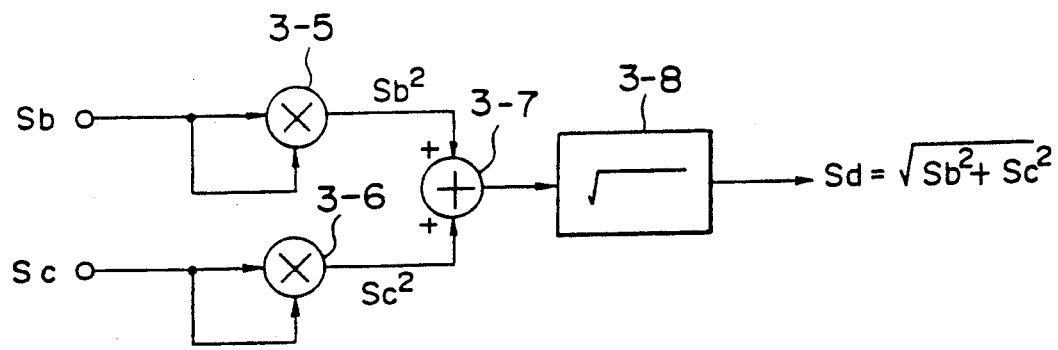

Two examples of circuit diagrams for the signal composer 3 are shown in FIGS. 5(a) and 5(b). In FIG. 5(a), an angle $\theta$ which is $$\theta = \tan^{-1}(S_b/S_c) \quad (5)$$

where the signals $S_b$ and $S_c$ are respectively set in axes of ordinate and abscissas, is determined by a block 3-1.

A block 3-2 determines a product of the signal $S_b$ multiplied by $\sin\theta$, that is $$S_b \cdot \sin\theta = S_b^2 / \sqrt{S_b^2 + S_c^2} \quad (6)$$

Furthermor, a block 3-3 determines a product Of the signal $S_c$ multiplied by $\cos\theta$, that is $$S_c \cdot \cos\theta = S_c^2 / \sqrt{S_b^2 + S_c^2} \quad (7)$$

The output signal Sd expressed by the equation (4) is then determined by adding the results of the equations (6) and (7) to each other by an adder 3-4.

In FIG. 5(b), $S_b^2$ and $S_c^2$ are respectively determined by multipliers 3-5 and 3-6 and are added to each other by an adder 3-7. The square root of the addition is determined by a block 3-8.

When a digital circuit is used, the signal composer 3 is realized by a circuit of table look-up type where data that has been calculated beforehand is written to a ROM or the like, and then the output of the signal composer 3 can be obtained by referring to the data.

Then, the signals $S_c$ and $S_d$ are supplied to the waveform shaper 4. Then, as described by equations (8) and (9), the waveform shaper 4 composes a signal $S_{d'}$, (not shown in FIG. 3) that has the reverse polarity of the signal $S_d$ in accordance with the polarity of the signal $S_c$.

$$S_{d'} = \text{sgn}(S_c) \cdot S_d \quad (8)$$

where sgn (x) is a function assuming +1, 0 and −1 when x is positive, zero and negative, respectively.

$$S_{d'} = \begin{cases} S_d & (0 \leq S_c) \\ -S_d & (S_c < 0) \end{cases} \quad (9)$$

The signal $S_c$ and the signal $S_{d'}$ are supplied to the subtracter 5. Then the subtracter 5 subtracts the signal $S_c$ from the signal $S_{d'}$ in accordance with the following equation and outputs a signal $S_e$ shown in FIG. 3(e).

$$S_e = S_{d'} - S_c \quad (10)$$

This signal $S_e$ is the edge emphasis component.

Figure 6:
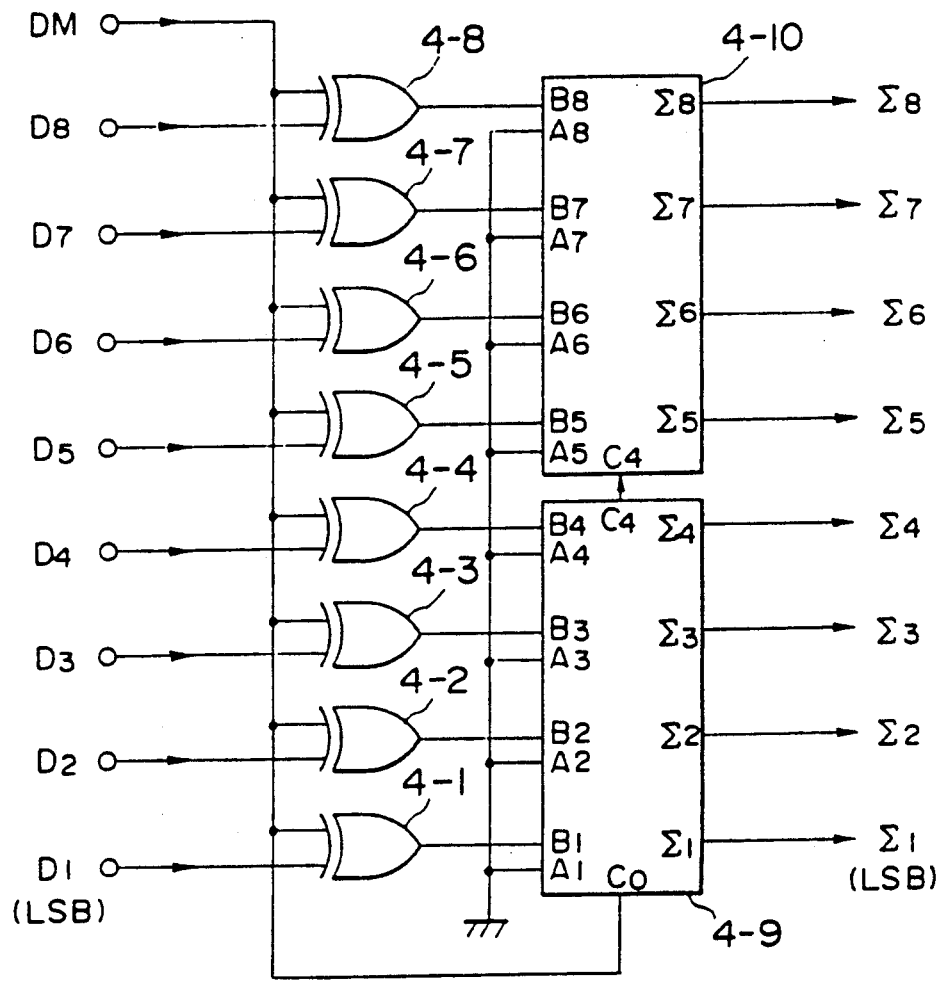
FIG. 6 is an example of a circuit diagram of a waveform shaper shown in FIGS. 1, 2, 10, 13 and 16.

An example of the circuit diagram Of the waveform shaper 4 is shown in FIG. 6, where blocks 4-1 to 4-8 are Ex-ORs (exclusive OR circuits) and blocks 4-9 and 4-10 are full adders.

Eight-bit data of $S_{d0}$ (Least Significant Bit) to $S_{d7}$ (Most Significant Bit) corresponding to the signal $S_d$ are supplied to input terminals D1 to D8 of the Ex-ORs 4-1 to 4-8, respectively. A most significant bit $S_{c7}$ of the signal $S_c$ is supplied in common to the other input terminals $D_M$.

Outputs of the Ex-ORs 4-1 to 4-8 are supplied to input terminals B1 to B4 of the full adder 4-9 and B5 to B8 of the full adder 4-10, respectively. The other input terminals A1 to A4 of the full adder 4-9 and A5 to A8 of the full adder 4-10 are all grounded. The bit $S_{c7}$ is also supplied to a carry input terminal Co of the full adder 4-9. The carry output terminal $C_4$ of the full adder 4-9 is connected to the carry input terminal $C_4$ of the full adder 4-10.

Eight-bit data of $S_{d'0}$ (Least Significant Bit) to $S_{d'7}$ (Most Significant Bit) corresponding to the signal $S_{d'}$ are outputted from output terminals $\Sigma 1$ to $\Sigma 4$ full adder 4-9 and $\Sigma 5$ to $\Sigma 8$ of the full adder 4-10. Processing corresponding to the equations (8) and (9) are then completed.

Figure 3G:
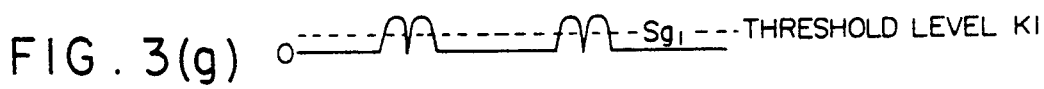
Figure 3H:
Figure 3I:

The adder 6 adds the edge emphasis component $S_e$ to the input signal $S_a$ and outputs a signal $S_i$ shown in FIG. 3(i). The signal $S_i$ has a waveform where its transition portions are reshaped, that is, the edge portions of the signal $S_a$ are emphasized.

In edge emphasizing operation described above, noise components are also emphasized. However, the edge portions of the signal $S_a$ only require to be emphasized, so that the edge emphasis component $S_e$ may be added to the input signal $S_a$ only when it has the edge portions. Reproductivity of the input signal $S_a$ can be improved owing to no noise emphasis.

In FIG. 1, the output signal $S_d$ of the signal composer 3 is supplied to the second orthogonal highpass filter 8 having the same frequency characteristics as that of the orthogonal highpass filter 1. A signal $S_f$ shown in FIG. 3(f) having a waveform like the signal $S_d$ being differentiated is obtained by the orthogonal highpass filter 8.

The signals $S_f$ and $S_d$ are supplied to the control signal generator 9 to determine a signal $S_{gl}$ shown in FIG. 3(g) in accordance with the following equation (11).

$$S_{gl} = |S_f|/(S_d + \epsilon) \quad (11)$$

where $\epsilon$ is a minute value to satisfy the following inequality (12) and is a constant for preventing overflow of the signal $S_{gl}$ when the signal $S_d$ is zero.

$$0 < \epsilon \ll |S_d| \quad (12)$$

The control signal generator 9 outputs a signal $S_g$ (not shown in FIG. 3) which is expressed by the following equation (13).

$$S_g = \begin{cases} 1 & (k1 \leq S_{gl}) \\ 0 & (S_{gl} < k1) \end{cases} \quad (13)$$

It is found that the signal $S_g$ takes a value 1 or 0 in accordance with the magnitude of the signal $S_{gl}$ to a threshold level kl.

In detail, the signal $S_{gl}$ takes a value between 0 and 1 as expressed by the following inequality (14).

$$0 \leq S_{gl} \leq 1 \quad (14)$$

The signal $S_{gl}$ is compared to the threshold level kl. If the signal $S_{gl}$ is equal to or greater than kl, the control signal generator 9 judges that there is a transition portion of the input signal $S_a$ and outputs a control signal $S_g$ of "1". On the other hand, if the former is smaller than the latter, the generator 9 judges that there is no transition portion of the input signal $S_a$ and outputs the control signal $S_g$ of "0".

Figure 7:
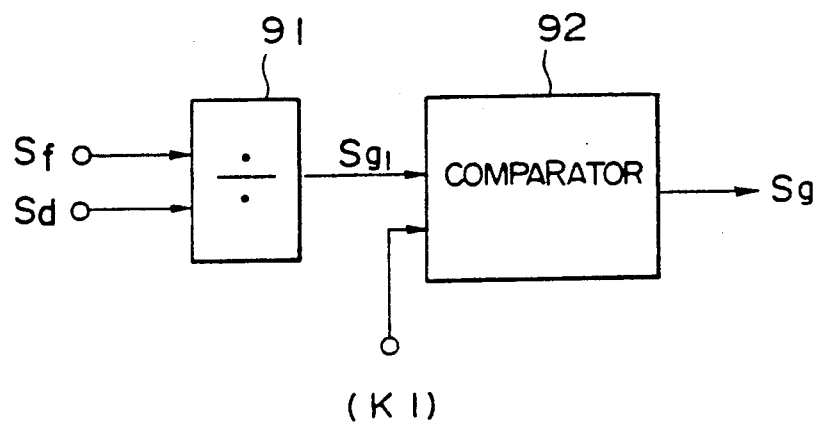
FIG. 7 shows an example of circuit diagram of a control signal generator 9 shown in FIG. 1.

FIG. 7 shows an example of the circuit diagram of the control signal generator 9. A block 91 is a divider for performing the operation in accordance with the equation (11) when the signals $S_d$ and $S_f$ are supplied thereto. The divider is realized by a ROM of table look-up type. The output signal $S_{gl}$ of the block 91 is compared with the threshold level kl in a block 92 which is a comparator. The block 92 then outputs the pulseformed control signal $S_g$.

Figure 8:
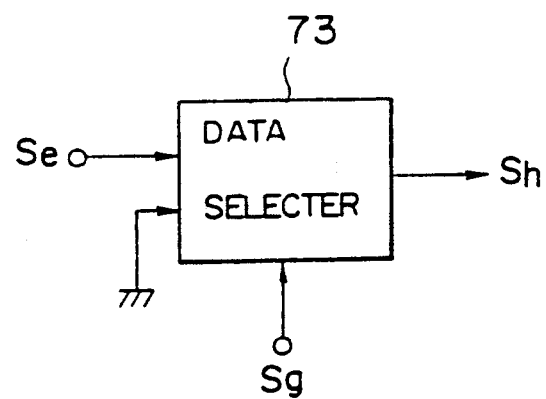
FIG. 8 shows an example of circuit diagram of a switching circuit 7 shown in FIG. 1.

In FIG. 1, the control signal $S_g$ and the output signal $S_e$ of the subtracter 5 are supplied to the switching circuit 7. FIG. 8 shows an example of the circuit diagram of the switching circuit 7. A block 73 is a data selecter an input terminal of which is supplied with the signal $S_e$ and the other grounded.

The data selecter 73 outputs "0" when the control signal $S_g$ is "0", while passes therethrough the signal $S_e$ as an output signal $S_h$, when the signal $S_g$ is "1". The output signal $S_h$ is shown in FIG. 3(h). As described above, the switching circuit 7 outputs the signal $S_e$ that is the signal $S_h$ as the edge emphasis component only on the period of time where the transition portion of the input signal $S_a$ is detected as the transition portion of the signal $S_d$.

In FIG. 1, the signal $S_h$ is supplied to the adder 6 where it is added to the input signal $S_a$ to output a signal $S_i$ as shown in FIG. 3(i). As shown in FIGS. 3(a) and 3(i), the output signal $S_i$ has a waveform where the transition (edge) portions of the signal $S_a$ is adequately emphasized. The output signal $S_i$ may be reproduced to obtain an image the edge portion of which is emphasized.

According to the first embodiment and as shown in FIG. 3(i), the output signal $S_i$ does not have any preshoots or overshoots which may go beyond the amplitude of the input signal $S_a$.

The signal $S_i$ Outputted from a line L2 of FIG. 1 is formed with side band components owing to the edge emphasis In other words, the spectrum going beyond the original band width of the input signal $S_a$ is added thereto. This addition of the spectrum improves sharpness of a reproduced image.

How much the transition portions of the output signal $S_i$ are emphasized depends on the frequency characteristics of the edge portions of the input signal $S_a$ before emphasized. The more steep the transition portions as shown in FIG. 3(j), the more edge emphasis being performed as shown in FIG. 3(k). On the other hand, the less steep as shown in FIG. 3(l), the less performed as shown in FIG. 3(m).

As described above, the edge emphasis component added to the input signal $S_a$ depends on the frequency characteristics thereof and has correlation thereto so that this signal shaping apparatus improves the sharpness and resolution of a reproduced image without the viewer being aware of an unnaturalness.

FIGS. 9(a)–9(i) show output signal waveforms of each of the blocks of FIG. 1 when a signal being amplitude-modulated by a modulation frequency $f_2$ of 4 MHz is supplied as the input signal $S_a$ to the signal shaping apparatus of FIG. 1. The frequency of 4 MHz is an upper limit frequency in the case of a TV signal in the NTSC system.

Figure 9A:
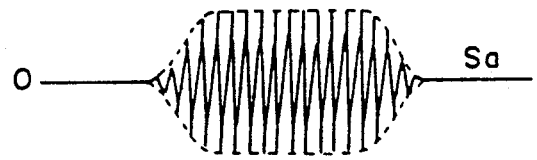
FIGS. 9(a) to 9(i) are views showing each waveform of signals that undergo signal processing by the apparatus shown in FIG. 1.
Figure 9B:
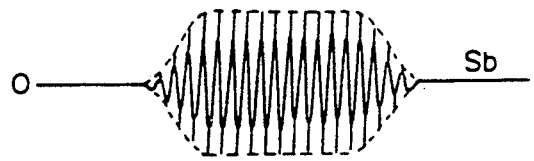
Figure 9C:
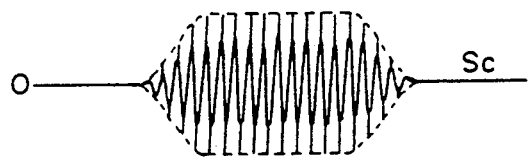
Figure 9D:
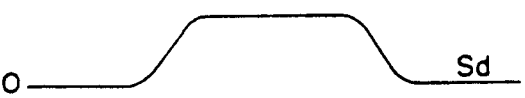
Figure 9E:
Figure 9F:
Figure 9G:
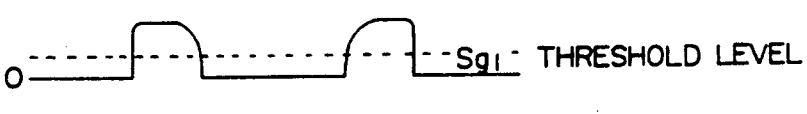
Figure 9H:
Figure 9I:

Envelopes depicted by dot lines to FIGS. 9(a) to 9(c) have the same waveform as that of the signal $S_d$ shown in FIG. 9(d). The signal $S_e$ shown in FIG. 9(e) is the edge emphasis component of the signal $S_d$, the signal $S_h$ shown in FIG. 9(h) is the edge emphasis component outputted from the switching circuit 7 and the signal $S_i$ shown in FIG. 9(i) is the output signal of the signal shaping apparatus of FIG. 1.

As shown in the signal $S_i$, sine waves on the transition portions of the envelope are reshaped in rectangular wave and are edge-emphasized. On the other hand, the signal portions of the signal $S_i$ where modulation waves of constant amplitude exist are not edge-emphasized and maintain the waveform of the input signal $S_a$. Therefore, this signal shaping apparatus is capable of signal waveform judging so that edge enhancement can be performed only on the portions of the input signal where edge enhancement is required.

As to the frequency characteristics, that shown in FIG. 4(a) is applied to the orthogonal highpass filters 1 and 8 and that shown in FIG. 4(c) to the in-phase highpass filter 2. However, that shown in FIG. 4(e) may be applied to the orthogonal highpass filters 1 and 8 and that shown in FIG. 4(f) to the in-phase highpass filter 2.

Figure 4E:
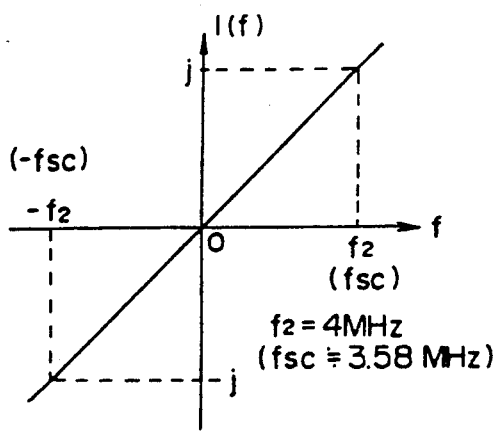
Figure 4F:
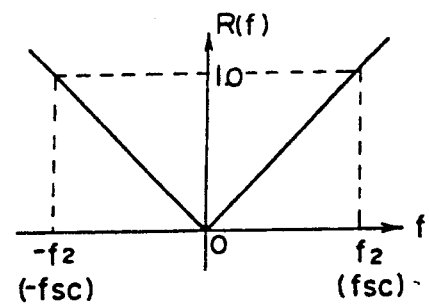

The frequency characteristics shown in FIGS. 4(e) and 4(f) are respectively expressed by the following equations (15) and (16).

$$I(f) = j\, f/f_2 \quad (f_2 = 4\text{ MHz}) \tag{15}$$

$$R(f) = |f/f_2| \tag{16}$$

Furthermore, the frequency characteristics shown in FIGS. 4(a), 4(e) and 4(c) may be applied to the orthogonal highpass filter 1, orthogonal highpass filter 8 and in-phase highpass filter 2, respectively.

Band width limitation to cut signal components existing outside the band width where the input signal $S_a$ exists may be applied to the frequency characteristics shown in FIGS. 4(a), 4(c), 4(e) and 4(f). This further reduces noise components included in the input signal.

As described above, the signal shaping apparatus shown in FIG. 1 comprises the orthogonal highpass filter 1, in-phase highpass filter 2, signal composer 3, waveform shaper 4, subtracter 5 and adder 6 for edge emphasizing and the switching circuit 7, orthogonal highpass filter 8 and control signal generator 9 for waveform judging. The waveform judging can be realized by a simple circuit configuration as described before.

Figure 10:
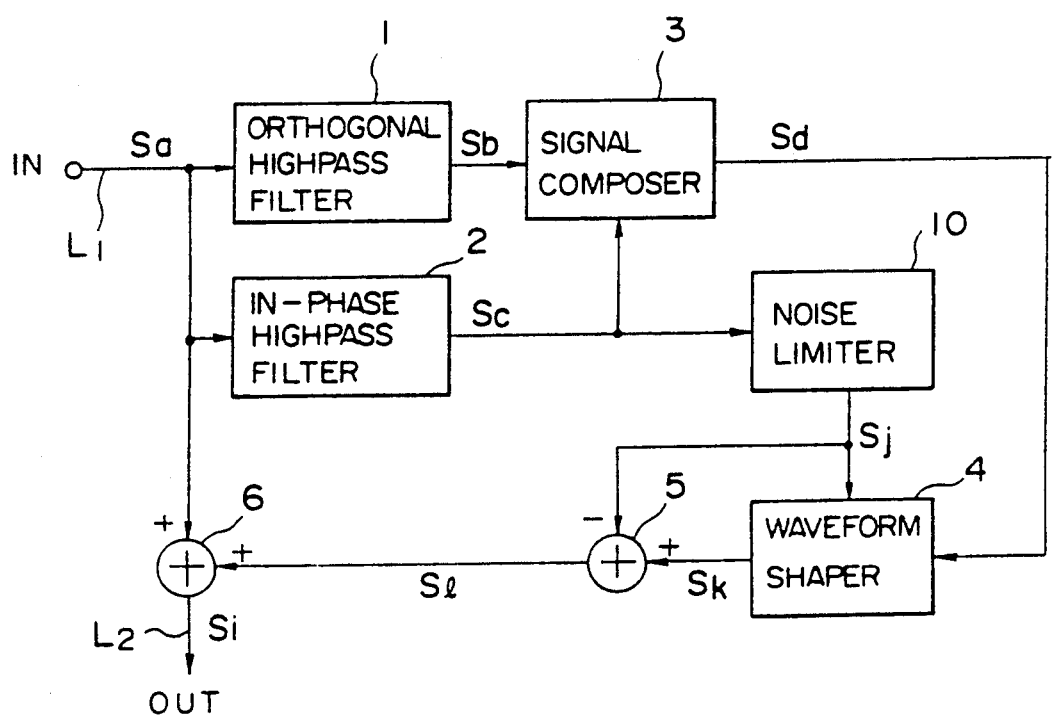
FIG. 10 is a block diagram of a second preferred embodiment of a signal shaping apparatus according to the present invention.

FIG. 10 shows a second preferred embodiment of the signal shaping apparatus according to the present invention. In FIG. 10, a noise limiter 10 is provided between the in-phase highpass filter 2 and waveform shaper 4. The noise limiter 10 outputs a signal $S_j$ which is subtracted from an output signal $S_k$ (not shown in FIG. 12) of the waveform shaper 4 by the subtracter 5.

Configuration and operation of the blocks in FIG. 10 except the noise limiter 10 are the same as those described with reference to FIGS. 1 and 2, so that those of the noise limiter 10 are only described in detail hereinafter.

Figure 11A:
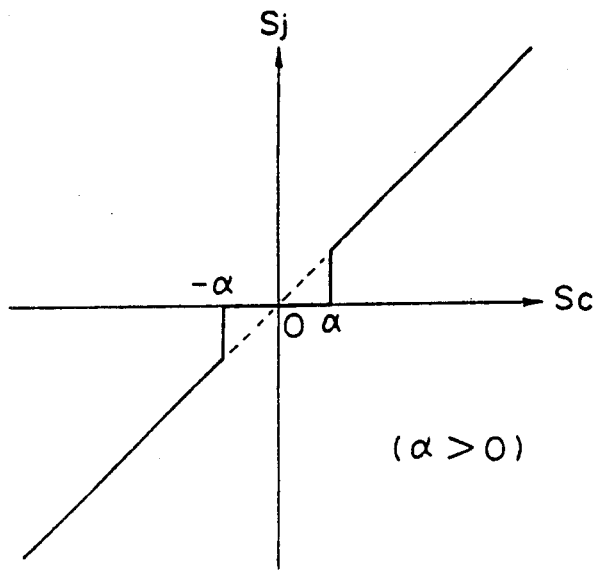
FIGS. 11(a) and 11(b) are views showing the input output characteristics of a noise limiter 10 shown in FIG. 10.

The output signal So of the in-phase highpass filter 2 is supplied to the noise limiter 10 which outputs the signal $S_j$. An example of the input-output characteristics of the noise limiter 10 is shown in FIG. 11(a) which is expressed by the following equation.

$$S_j = \begin{cases} 0 & (|S_c| < \alpha) \\ S_c & (\alpha \leq |S_c|) \end{cases} \tag{17}$$

It is found that the noise limiter 10 outputs no signal if the amplitude of the signal $S_c$ is smaller than $\alpha$, while passes therethrough the signal $S_c$ as the signal $S_j$ if the former is equal to or greater than the latter.

Accordingly, noise components of the amplitude less than $\alpha$, corresponding to the signal components having the amplitude less than $\alpha$ of the signal $S_c$ can be rejected.

This results in formation of the edge emphasis components on the basis of the polarity of the output signal $S_j$ (described in detail later). To limit the noise components of small level included in the signal $S_c$ the polarity of which may be inverted by the noise components improves the quality of a reproduced image.

Figure 12A:
FIGS. 12(a) to 12(k) are views showing the waveform of signals that undergo signal processing in each section shown in FIG. 10.
Figure 12B:
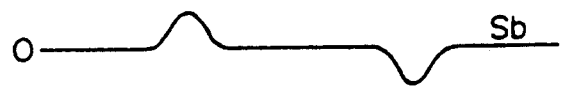
Figure 12C:
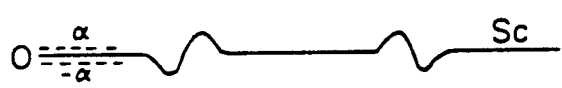
Figure 12D:
Figure 12E:
Figure 12F:

An actual $\alpha$ has a minute value which is in several percent to the dynamic range of the input signal $S_a$. The value $\alpha$ is depicted by dot lines in FIG. 12(c) and the output signal $S_j$ of the noise limiter 10 is shown in FIG. 12(e).

Provision of the noise limiter 10 before the waveform shaper 4 which outputs the signal $S_k$ for the edge emphasis improves the polarity-judgment of the waveform shaper 4.

Figure 11B:
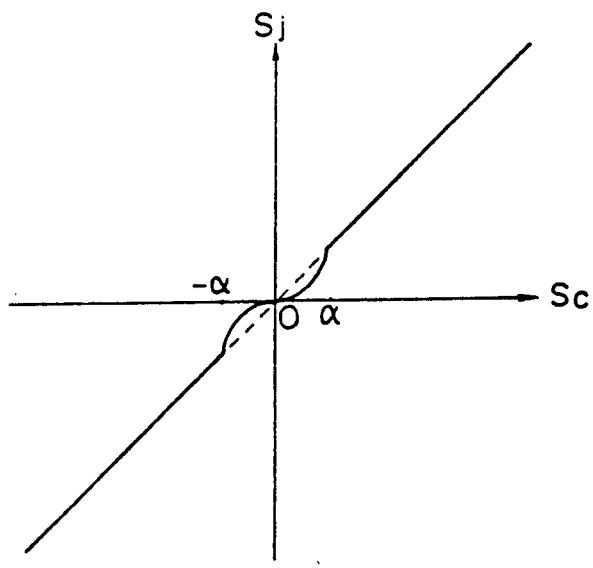

FIG. 11(b) shows another example of the frequency characteristics of the noise limiter 10, which is expressed by the following equation (18).

$$S_j = \begin{cases} S_c \cdot (S_c/\alpha)^2 & (|S_c| < \alpha) \\ S_c & (\alpha \leq |S_c|) \end{cases} \quad (18)$$

It is found that the noise limiter 10 limits the noise components with the square-law characteristics if the amplitude of the signal $S_c$ is smaller than $\alpha$, while passes therethrough the signal $S_c$ as the signal $S_j$ if the former is equal to or greater than $\alpha$, the same as shown in FIG. 11(a).

Compared to the frequency characteristics shown in FIG. 11(a), that shown in FIG. 11(b) gives less influence of noise limitation to the waveform of the signal $S_c$. The noise limiter 10 can be realized by a ROM of table look-up type.

In FIG. 10, the output signals $S_j$ and $S_d$ are supplied to the waveform shaper 4. Then, as described by the equations (19) and (20), the waveform shaper 4 composes the signal $S_k$ with the inverse polarity of the signal $S_d$ in accordance with the polarity of the signal $S_j$.

$$S_k = \text{sgn}(S_j) \cdot S_d \quad (19)$$

$$S_k = \begin{cases} S_d & (0 \leq S_j) \\ -S_d & (S_j < 0) \end{cases} \quad (20)$$

The signals $S_j$ and $S_k$ are supplied to the subtracter 5. The subtracter 5 subtracts the signal $S_j$ from the signal $S_k$ and outputs a signal $S_l$ shown in FIG. 12(f) in accordance with the following equation (21).

$$S_l = S_k - S_j \quad (21)$$

This signal S1 is the edge emphasis component.

Figure 12G:
Figure 12H:
Figure 12I:
Figure 12J:
Figure 12K:

The adder 6 adds the edge emphasis component to the input signal $S_a$ and outputs the signal $S_i$ shown in FIG. 12(g).

Compared to the input signal $S_a$, the waveform of the output signal $S_i$ has steps at its steep transitions corresponding to the mid portions of the transitions portions of the input signal $S_a$. This results in adequate edge emphasis. Furthermore, there is no preshoots or overshoots found in the signal $S_i$. As shown in FIGS. 12(h) to 12(k) and described before in FIGS. 3(j) to 3(m), the edge emphasis of the signal $S_i$ depends on the frequency characteristics of the edge portions of the signal $S_a$ before edge emphasizing.

Figure 13:
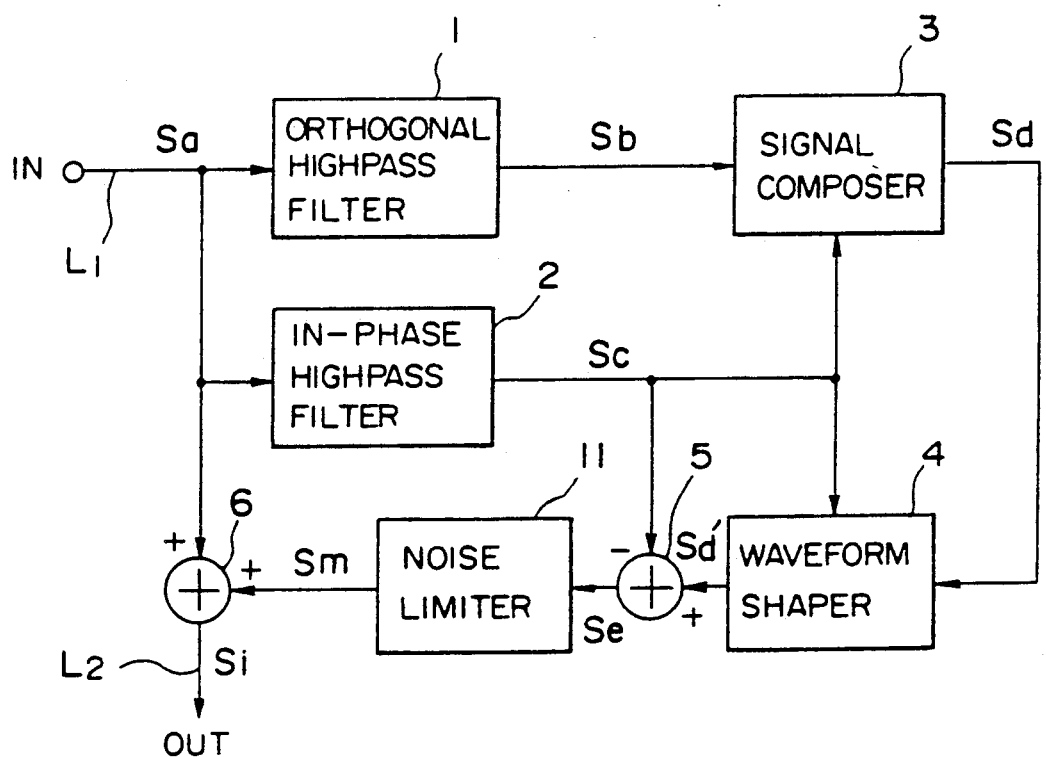
FIG. 13 is a block diagram of a third preferred embodiment of a signal shaping apparatus according to the present invention.

FIG. 13 shows a third preferred embodiment of the signal shaping apparatus according to the present invention. In FIG. 13, a noise limiter 11 is provided between the subtracter 5 and adder 6. The noise limiter 11 outputs a signal $S_m$ when supplied with the output signal $S_e$ of the subtracter 5.

Configuration and operation of the blocks in FIG. 13 except the noise limiter 11 are the same as those described with reference to FIGS. 1 and 2, so that those of the noise limiter 11 are only described in detail hereinafter.

Figure 14A:
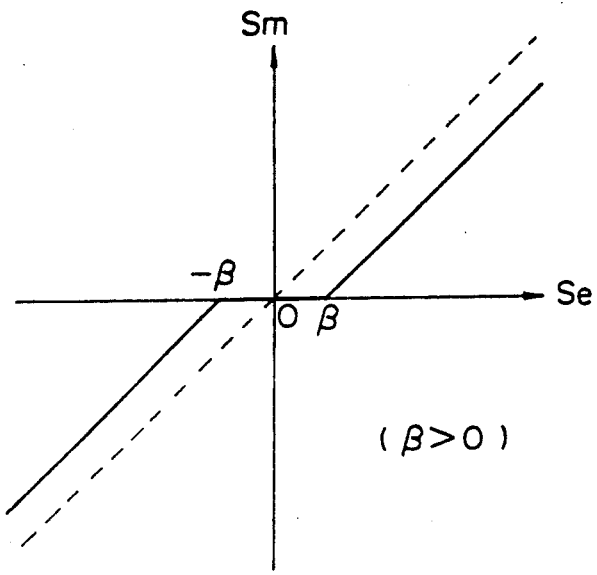
FIGS. 14(a) and 14(b) are views showing the input-output characteristics of a noise limiter 11 shown in FIG. 13.

An example of the input-output characteristics of the noise limiter 11 is shown in FIG. 14(a) which is expressed by the following equation.

$$S_m = \begin{cases} 0 & (|S_e| \leq \beta) \\ S_e - \beta & (\beta < S_e) \\ S_e + \beta & (S_e < -\beta) \end{cases} \quad (22)$$

where $\beta$ is a positive constant.

It is found that the noise limiter 11 outputs no signal if the amplitude of the signal $S_e$ is equal to or smaller than while outputs a signal obtained by subtracting $\beta$, from the signal $S_e$ if the former is greater than the latter. Furthermore, the limiter 11 outputs a signal obtained by adding $\beta$ to the signal $S_e$ if the amplitude of the signal $S_e$ is smaller than $-\beta$. This processing, in accordance with the frequency characteristics shown in FIG. 14(a) which is non-linear, is called threshold processing.

Figure 15A:
FIGS. 15(a) to 15(k) are views showing the waveform of signals that undergo signal processing in each section of the apparatus shown in FIG. 13.
Figure 15B:
Figure 15C:
Figure 15D:
Figure 15E:
Figure 15F:

Accordingly, noise components of the amplitude less than $\beta$, corresponding to the signal components having the amplitude less than $\beta$ of the signal $S_e$ can be limited. The output signal $S_m$ of the noise limiter 11 is shown in FIG. 15(f).

An actual $\beta$ has a minute value which is in several percent to the dynamic range of the input signal $S_a$. Dot lines depicted in FIG. 14(a) shows the input-output characteristic of the noise limiter 11 if no noise limitation, for comparison with the threshold processing. The characteristic is expressed by the following equation.

$$S_m = S_e \quad (23)$$

Provision of the noise limiter 11 next to the subtracter 5 in order to limit the noise components included in the edge emphasis component $S_e$ yields the followings:

The noise components, included in the minute components which should be zero included in the edge emphasis component $S_e$, that is, the signal components added to the portions of the input signal $S_a$ where edge emphasis is not needed, are limited so that adequate edge emphasis components can be obtained.

Furthermore, as to the great amplitude portion of the edge emphasis component $S_e$ to be added to the transition portion of the input signal $S_a$, the noise limiter 11 does not work well, however the minute noise components included in the great amplitude portion are masked, so that the minute noise components scarcely influence the edge emphasis operation.

More adequate edge emphasis component can be obtained by respectively providing the noise limiters 10 and 11 in the former and latter stages of the waveform shaper 4.

Figure 14B:
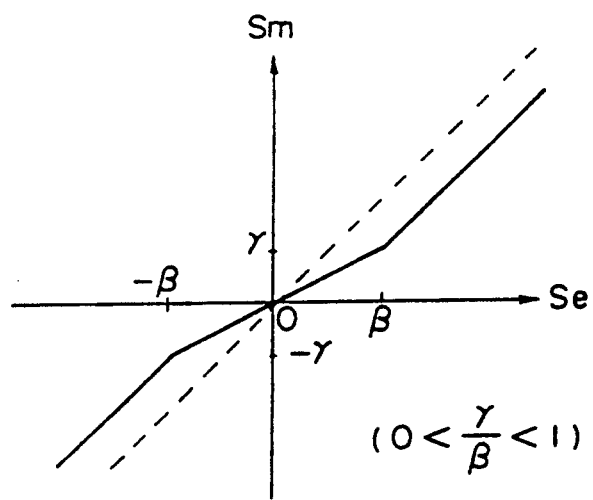

FIG. 14(b) shows another example of the input-output characteristics of the noise limiter 11, which is expressed by the following equation (24), $$S_m = \begin{cases} (\Delta/\beta)S_e & (|S_e| \leq \beta) \\ S_e - \gamma & (\beta < S_e) \\ S_e + \gamma & (S_e < -\beta) \end{cases} \quad (24)$$

where $\beta > 0, \gamma > 0$ and $0 < \gamma/\beta < 1$.

The noise limiter 11 also limits the minute noise components with the characteristics shown in FIG. 14(b).

Compared to the characteristics shown in FIG. 14(a), that shown in FIG. 14(b) gives less influence of noise limitation to the waveform of the signal $S_m$. The noise limiter 11 can be realized by a ROM of table look-up type.

In FIG. 13, the output signal $S_m$ of the noise limiter 11 is supplied to the adder 6 and is added to the input signal $S_a$.

Figure 15G:
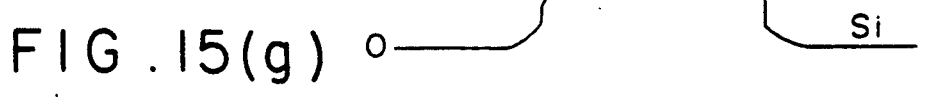
Figure 15H:
Figure 15I:
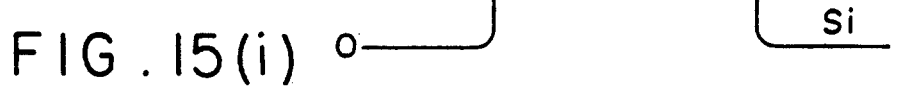
Figure 15J:
Figure 15K:

The edge emphasized output signal $S_i$ is shown in FIG. 15(g). As shown in FIGS. 15(h) to 15(k) and described before in FIGS. 3(j) to 3(m), the edge emphasis of the signal Si depends on the frequency characteristics of the portions of signal Sa before edge emphasizing.

Figure 16:
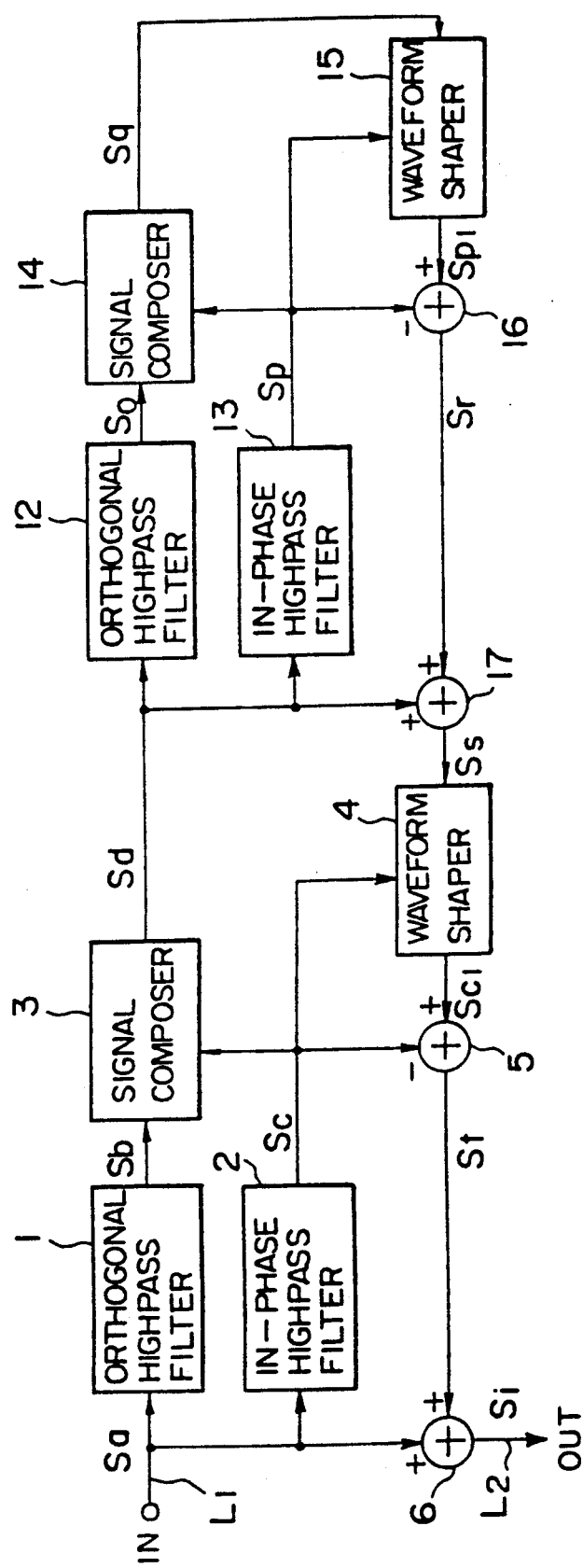
FIG. 16 is a block diagram of a fourth preferred embodiment of a signal shaping apparatus according to the present invention.

FIG. 16 shows a fourth preferred embodiment of the signal shaping apparatus according to the present invention, comprising two stages of the main sections of FIG. 2.

Figure 17A:
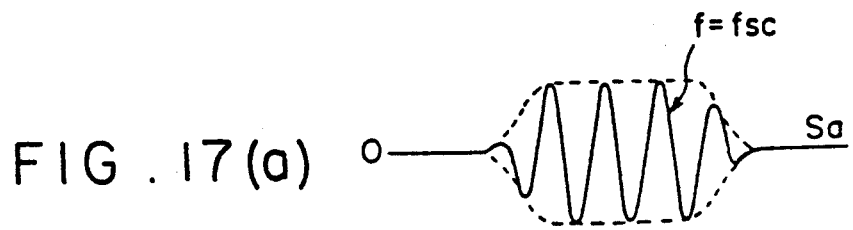
FIGS. 17(a) to 17(p) are views showing the waveform of signals that undergo signal processing in each section shown in FIG. 16.
Figure 18:
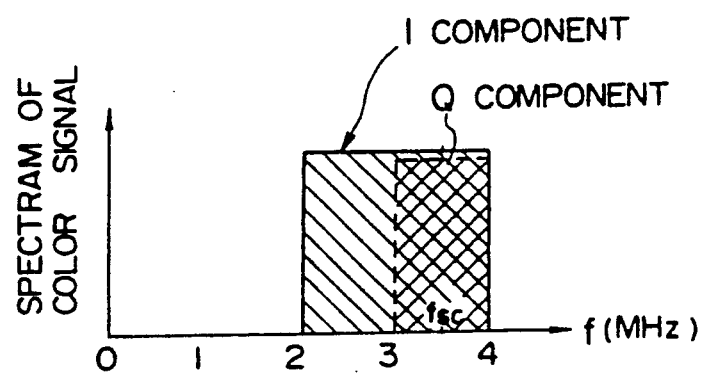
FIG. 18 is a view describing, in modeling the spectral distribution of a color signal.

The input signal $S_a$ that coming from the line L1 is assumed a color signal being amplitude-modulated by a carrier frequency f=fsc as shown in FIG. 17(a). The color signal is, as shown in FIG. 18, a composite wave of the quadrature two phase-modulated wave which is distributed over a frequency range of 2 to 4 MHz with the color subcarrier (the color subcarrier fsc being about 3.58 MHz). In FIG. 18, I and Q components are respectively orange and cyan system and green and magenta system.

The input signal $S_a$ is supplied to the orthogonal highpass filter 1 the frequency characteristics of which is shown in FIG. 4(a), fsc being employed instead of $f_2$. The orthogonal highpass filter 1 outputs the signal $S_b$ (a first orthogonal signal), shown in FIG. 17(b), which has the waveform the carrier of the input signal $S_a$ being delayed by a 90° phase.

The input signal $S_a$ is also supplied to the in-phase highpass filter 2, the frequency characteristics of which is shown in FIG. 4(c), fsc being employed instead of $f_2$. The in-phase highpass filter 2 outputs the signal $S_c$ (a first in phase signal), shown in FIG. 17(c), which has the waveform of the same phase as that of the input signal $S_a$.

Figure 17B:
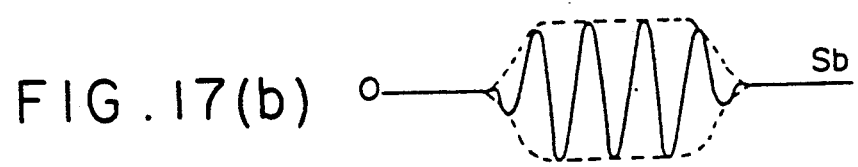
Figure 17C:
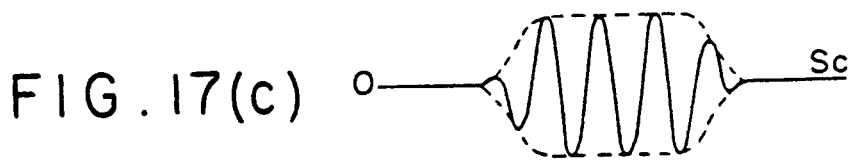
Figure 17D:
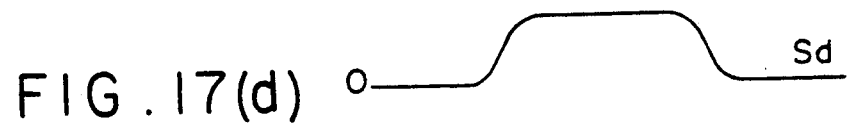

The signals $S_b$ and $S_c$ are supplied to the signal composer 3 to output the signal $S_d$ (a first envelope signal) shown in FIG. 17(d) having the same waveform as depicted by dot lines in FIGS. 17(a) to 17(c).

Figure 17E:
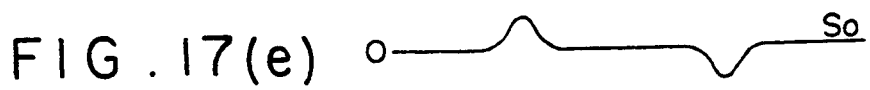

The signal $S_d$ is supplied to an orthogonal highpass filter 12 having the same frequency characteristics as that of the orthogonal highpass filter 1. The orthogonal highpass filter 12 outputs a signal $S_o$ (a second orthogonal signal), shown in FIG. 17(e), which has a waveform like the signal $S_d$ being differentiated.

Figure 17F:
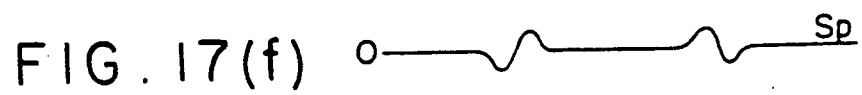
Figure 17G:
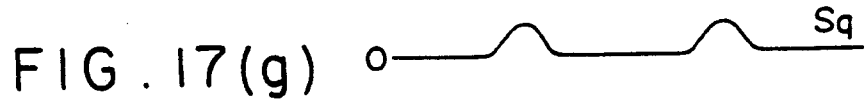

The signal $S_d$ is also supplied to an in-phase highpass filter 13 having the same frequency characteristics as that of the in-phase highpass filter 2. The in-phase highpass filter 13 outputs a signal $S_p$ (a second in-phase signal) shown in FIG. 17(f).

The signals $S_o$ and $S_p$ are supplied to a signal composer 14, equivalent to the signal composer 3, which outputs a signal $S_q$ (a second envelope signal) which is the square root of the sum of the two signals in accordance with the following equation (25).

$$S_q = \sqrt{S_o^2 + S_p^2} \quad (25)$$

The signals $S_p$ and $S_q$ are supplied to a waveform shaper 15 which outputs a signal $S_{pl}$ (not shown in FIG. 17) in accordance with the following equations (26) and (27).

$$S_{pl} = sgn(S_p) * S_q \quad (26)$$

$$S_{p1} = \begin{cases} S_q & (0 \leq S_p) \\ -S_q & (S_f < 0) \end{cases} \quad (27)$$

The signal $S_{pl}$ has the same amplitude as that of the signal $S_q$ and the same polarity as that of the signal $S_p$.

Figure 17H:
Figure 17I:
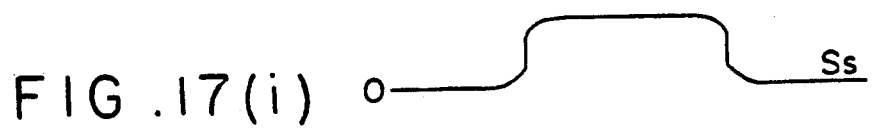

A subtracter 16 subtracts the signal $S_p$ from the signal $S_{pl}$ to output a signal $S_r$ (a second edge emphasis signal) shown in FIG. 17(h). The signal $S_r$ has a waveform the polarity of which is inverted at the timing of the mid portions of the transition portions of the signal $S_d$. The signal $S_r$ is thus the edge emphasis component of the signal $S_d$.

The output signal $S_r$ of the subtracter 16 is supplied to an adder 17 and then added to the signal $S_d$. The adder outputs $S_s$ shown in FIG. 17(i) which has the waveform like the mid portions of the transition portions of the signal $S_d$ becoming steep.

The signals $S_s$ and $S_c$ are supplied to the waveform shaper 4 which outputs a signal $S_{cl}$ (not shown in FIG. 17) in accordance with the following equations (28) and (29).

$$S_{cl} = sgn(S_c) * S_s \quad (28)$$

$$S_{c1} = \begin{cases} S_s & (0 \leq S_c) \\ -S_s & (S_c < 0) \end{cases} \quad (29)$$

Figure 17J:
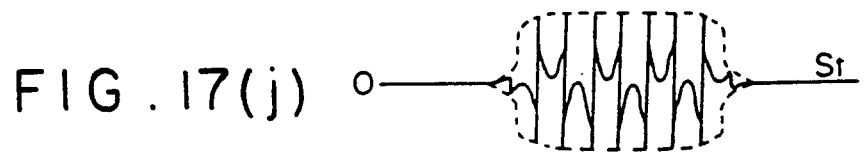

The subtracter 5 subtracts the signal $S_c$ from the signal $S_{cl}$ to output a signal $S_t$ (a first edge emphasis signal) shown in FIG. 17(j). The signal $S_t$ is to edge-emphasize the carrier included in the signal $S_c$. The envelope depicted by dot lines in FIG. 17(j) has the same waveform as that of the signal $S_s$. The signal $S_t$ thus includes the edge emphasis component of the envelope of the input signal $S_a$.

Figure 17K:
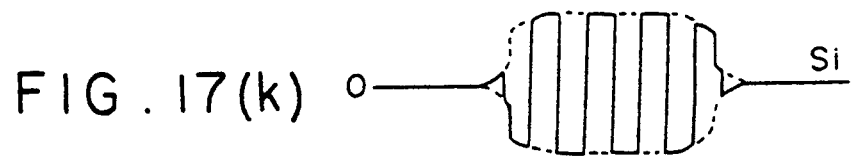

The adder 6 adds the signal $S_t$ to the input signal $S_a$ to output a signal $S_i$ shown in FIG. 17(k).

Compared to the input signal $S_a$, the carrier included in the output signal $S_i$ is reshaped in rectangular wave and the transition portions of the envelope become steep. This results in adequate edge emphasis.

As shown in FIGS. 17(m) to 17(p) and described before, the edge emphasis of the signal $S_s$ which is the envelope of the signal $S_i$ depends on the frequency characteristics of the edge portions of the signal $S_d$ which is the envelope of the input signal $S_a$ before edge-emphasizing.

Figure 17L:
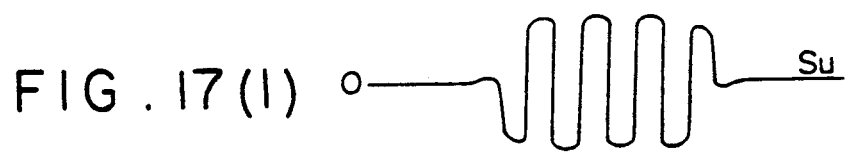
Figure 17M:
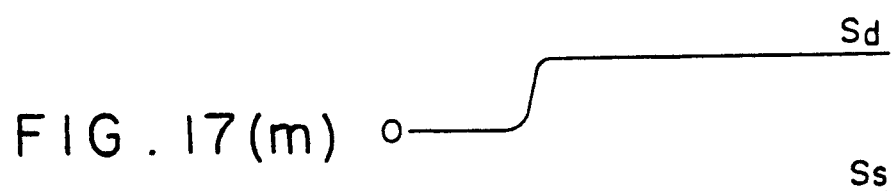
Figure 17N:
Figure 17O:
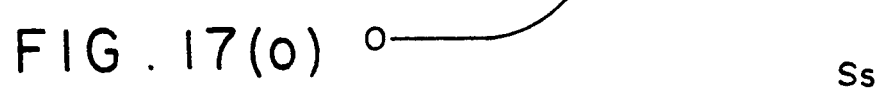
Figure 17P:
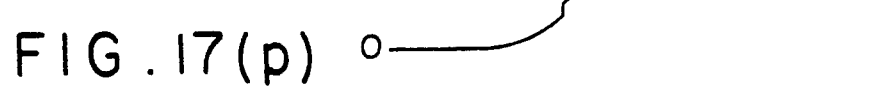

The edge emphasis can be controlled by decreasing an output level of the signal $S_t$ (the first edge emphasis signal) or providing a filter for rejecting side-band components not required from the output signal $S_i$. An edge emphasis-controlled signal $S_u$ is shown in FIG. 17(l).

As to the frequency characteristics, those shown in FIGS. 4(a) and 4(c) are respectively applied to the orthogonal highpass filters 1 and 12 and in-phase highpass filters 2 and 13. Those shown in FIGS. 4(e) and 4(f) however may be respectively applied to the orthogonal highpass filters 1 and 12 and in-phase highpass filters 2 and 13, fsc being employed instead of $f_2$. The frequency characteristics shown in FIGS. 4(e) and 4(f) are respectively expressed by the following equations (30) and (31).

$$I(f) = j\, f/fsc \quad (fsc = 3.58 \text{ MHz}) \tag{30}$$

$$R(f) = f/fsc \tag{31}$$

The frequency characteristics shown in FIGS. 4(a), 4(c), 4(e) and 4(f) may be respectively applied to the orthogonal highpass filter 1, in-phase highpass filter 2, orthogonal highpass filter 12 and in-phase highpass filter 13.

Furthermore, if the band width of the color signal is adequately maintained, the input signal $S_a$ may be passed through the in-phase highpass filter 2 with canceling the frequency characteristics shown in FIG. 4(c).

As described above, the edge emphasis can be performed not only on the transition portions of the input signal $S_a$ but also the carrier thereof. The signal $S_i$ added with frequency components outside the band width of the signal $S_a$ can be obtained, so that color running of a reproduced image which may be occurred when the band width of the color signal is narrowed can be prevented.

In addition, each of the elements configuring the present invention can be configured from combinations of conventional circuits and so it is possible to easily realize the present invention and for it to have a wide range of uses.

Moreover, in the above description, the input signal can be the luminance signal, the color signal of the TV signal, or primary color signals for each of the RGB colors.

The uses of the signal shaping apparatus of the present invention are not limited to TV receivers, as the present invention can find application in video tape recorders (VTR), printers and other types of video apparatus, various types of image processing apparatus used for performing the recognition, measurement, quantification, diagnosis and other operations for images. Application to data communications apparatus is also possible in order to improve the eye pattern.

What is claimed is:

1. A signal shaping apparatus for emphasizing transition portions of an input signal which has signal components in a specific frequency band, comprising:

means connected to the input signal, for delaying the phase of the input signal by $\pi/2$ to output a $\pi/2$ phase-delayed input signal as a first signal, wherein the closer the signal components are to the upper limit frequency of the frequency band, the less the signal components attenuate;

means connected to the input signal, for outputting a second signal, wherein the closer the signal components are to the upper limit frequency of the frequency band, the less the signal components attenuate, the second signal having the same amplitude as and a phase shift $\pi/2$ from that of the first signal;

means connected to the means for outputting the second signal and also connected to the means for delaying the phase of the input signal, for performing vector composition of the first and second signals to obtain a first square root which is the square root of the sum of the squares of the amplitudes of the first and second signals to output a third signal having an amplitude corresponding to the first square root;

means connected to the means for performing vector composition of the first and second signals, for delaying the phase of the third signal by $\pi/2$ to output a $\pi/2$ phase-delayed version of the third signal as a fourth signal, wherein the closure the signal components of the third signal are to the upper limit frequency of the frequency band, the less the signal components of the third signal attenuate;

means connected to the means for performing vector composition of the first and second signals, for outputting a fifth signal, wherein the closer the signal components of the third signal are to the upper limit frequency of the frequency band, the less the signal components of the third signal attenuate, the fifth signal having the same amplitude as and a phase shifted $\pi/2$ from that of the fourth signal;

means connected to means for outputting the fifth signal and also connected to the means for delaying the phase of the third signal, for performing vector composition of the fourth and fifth signals to obtain a second square root which is the square root of the sum of the squares of the amplitudes of the fourth and fifth signals to output a sixth signal having an amplitude corresponding to the second square root;

means connected to the means for outputting the fifth signal and also connected to the means for performing vector composition of the fourth and fifth signals, for combining the fifth and sixth signal to output a seventh signal having the same base as that of the fifth signal and the same amplitude as that of the sixth signal;

a first subtracter connected to the means for outputting the fifth signal and also connected to the mans for combining the fifth and sixth signals, for subtracting the fifth signal from the seventh signal to output a first transition portion emphasis signal;

a first adder connected to the first subtracter and also connected to the means for performing vector composition of the first and second signals, for adding the first transition portion emphasis signal to the third signal to output an eight signal;

means connected to the means for outputting the second signal and also connected to the first adder, for combining the second and eight signals to output a ninth signal having the same phase as that of the second signal and the same amplitude as that of the eight signal;

a second subtracter connected to the means for outputting the second signal nd also connected to the means for combining the second and eight signals, for subtracting the second signal from the ninth signal to output a second transition portion emphasis signal; and a second adder connected to the input signal and also connected to the second subtracter, for adding the second transition portion emphasis signal to the input signal to thereby emphasize the transition portions of the input signal.

2. A signal shaping apparatus for emphasizing transition portions of an input signal which has signal components in a specific frequency band, comprising:

means for delaying the phase of the input signal by $\pi/2$, to output a $\pi/2$ phase-delayed input signal as a first signal, wherein the closer the signal components are to the upper limit frequency of the frequency band, the less the signal components attenuate;

means responsive to the input signal for outputting a second signal wherein the closer the signal components are to the upper limit frequency of the frequency band, the less the signal components are attenuated, the second signal having the same amplitude as and a phase shifted $\pi/2$ from that of the first signal;

means connected to the means or delaying the phase of the input signal and also connected to the means or outputting the second signal, for performing vector composition of the first and second signal to obtain the square root of a sum of the squares of the amplitudes of the first and second signals to output a third signal having amplitudes corresponding of said square root;

means connected to the means for performing vector composition and also connected to the mans or outputting the second signal, for combining the second and third signal with each other to output a fourth signal having the same phase as that of the second signal and the same amplitude as that of the third signal;

means connected to the means for performing vector composition, for delaying the phase of the third signal by $\pi/2$, to output a $\pi/2$ phase-delayed third signal as a fifth signal, wherein the close the signal components of the third signal are to the upper limit frequency of the frequency band, the less the signal components of the third signal are attenuated;

a subtracter connected to the means for outputting the second signal and the means for combining, for subtracting the second signal from the fourth signal to output a transition portion emphasis signal;

means connected to the means for delaying the phase of the third signal and also connected to the means for performing vector composition, for judging as to whether a ratio in amplitude of the third and fifth signals to each other is greater than a reference value to output a control signal when the ratio is equal to or greater than the reference value;

an adder for adding the transition portion emphasis signal to the input signal to emphasize the transition portions of the input signal; and switching means, responsive to the control signal, for selectively allowing the adder to conduct the addition.

3. A signal shaping apparatus for emphasizing transition portions of an input signal which has signal components in a specific frequency band, comprising:

means for delaying the phase of the input signal by $\pi/2$ to output a $\pi/2$ phase-delayed input signal as a first signal, wherein the closer the signal components are to the upper limit frequency of the frequency band, the less the signal components attenuate;

means responsive to the input signal for outputting a second signal, wherein the closer the signal components are to the upper limit frequency of the frequency band, the less the signal components are attenuated, the second signal having the same amplitude as and a phase shifted $\pi/2$ from that the of the first signal;

means connected to the means for delaying the phase of the input signal and also connected to the means for outputting the second signal, for performing vector composition of the first and second signals to obtain the square root of a sum of this squares of the amplitudes of the first and second signals to output a third signal having an amplitude corresponding to said square root;

means connected to the means for outputting the second signal, for comparing the second signal with a reference signal in amplitude to allow the second signal to pass through the means for comparing as a fourth signal when the second signal is equal to or greater than therefore signal;

means connected to the means for performing vector composition as also connected to the means for comparing, for combining the third and forth signal a with each other to output a fifth signal having the same amplitude as that of the third signal and the same phase as that of the fourth signal;

a subtracter connected to the means for combining and the means for comparing, for subtracting the fourth signal from the fifth signal to output a transition portion emphasis signal; and an adder for adding the transition portion emphasis signal to the input signal to emphasize the transition portions of the input signal.

4. A signal shaping apparatus of emphasizing transition portions of an input signal which has signal components in a specific frequency band, comprising:

means for delaying the phase of the input signal by $\pi/2$ to output a $\pi/2$ phase-delayed input signal as a first signal, wherein the closer the signal components are to the upper limit frequency of the frequency band, the less the signal components attenuate;

means responsive to the input signal for outputting a second signal, wherein the closer the signal components are to the upper limit frequency of the frequency band, the less the signal components are attenuated, the second signal having the same amplitude and a phase shifted $\pi/2$ from that of the first signal;

means connected to the means for delaying the phase of the input signal and also connected to the means for outputting the second signal, for performing vector composition of the first and second signals to obtain the square root of a sum of the squares of the amplitudes of the first and second signals to output a third signal having an amplitude corresponding to said square root;

means connected to the means or outputting the second signal and also connected to the means for performing vector composition, for combining the second and third signal with each other of t output a fourth signal having the same phase as that of the second signal and same amplitude as that of the third signal;

a subtractor connected to the means for combining and the means for outputting the second signal, for subtracting the second signal from the fourth signal to output a first transition portion emphasis signal;

means connected to the subtractor for comparing the first transition portion emphasis signal with a reference signal in amplitude to allow the first transition portion emphasis signal to pass through the means for comparing as a second transition portion emphasis signal when the first transition portion emphasis signal is greater than the reference signal; and an adder for adding the second transition portion emphasis signal to the input signal to emphasize the transition portions of the input signal.

* * * * *